United States Patent [19]

Proni

[11] Patent Number: 4,998,831
[45] Date of Patent: Mar. 12, 1991

[54] FORCE CONCENTRATING UNITARY FITTING

[75] Inventor: Oscar Proni, Hollywood, Fla.
[73] Assignee: Proni Creations Inc., Miami, Fla.
[21] Appl. No.: 391,386
[22] Filed: Aug. 9, 1989

Related U.S. Application Data

[63] Continuation of Ser. No. 73,637, Jul. 15, 1987, abandoned.

[51] Int. Cl.⁵ .............................................. F16L 21/06
[52] U.S. Cl. .................................. 285/322; 285/382.2
[58] Field of Search ............... 285/322, 319, 255, 238, 285/115, 116, 382.2, 382.1, 382

[56] References Cited

U.S. PATENT DOCUMENTS

| | | | |
|---|---|---|---|
| 1,659,268 | 2/1928 | Hooley | 285/322 |
| 2,383,692 | 8/1945 | Smith | 285/322 |
| 2,580,818 | 1/1952 | Mundy et al. | 285/115 X |
| 3,232,648 | 2/1966 | Franck | 285/322 |
| 3,498,648 | 3/1970 | Hallesy | 285/382.2 X |
| 3,884,513 | 5/1975 | Gassert | 285/322 |
| 4,103,941 | 8/1978 | Stoll | 285/238 |
| 4,288,112 | 9/1981 | Stoll | 285/322 X |
| 4,328,979 | 5/1982 | Stoll | 285/322 X |
| 4,328,982 | 5/1982 | Christianson | 285/382.2 X |
| 4,530,523 | 7/1985 | Proni | 285/322 X |
| 4,552,387 | 11/1985 | Schmidt | 285/322 X |

Primary Examiner—Dave W. Arola
Attorney, Agent, or Firm—John J. Byrne

[57] ABSTRACT

A fitting assembly of the type specifically designed to be used in combination with the gripping, fitting and otherwise interconnection of conduits intended for the containment and flow therethrough of high pressure fluids. The fitting assembly comprises a fitting body having a base, an integrally formed outwardly extending segments wherein the base and the segments are disposed in surrounding relation to a substantially coaxially disposed central passage which is dimensioned to receive the conduit therein. A force applying structure is secured in surrounding relation to the plurality of segments and in force transferring engagement to a first outer surface portion of each of the segments and in non-force transferring relation to a second portion of each of the segments wherein a bending moment is created substantially about a gripping portion such that a bending support surface contiguous to the free end of each segment is forced inwardly towards the conduit within the passage means and into engagement with the outer surface thereof to relieve stress from the point of penetrating or gripping engagement of the gripping portion and the conduit.

20 Claims, 4 Drawing Sheets

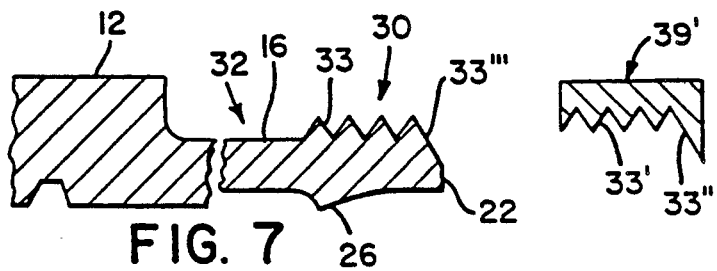
FIG. 7   FIG. 7A
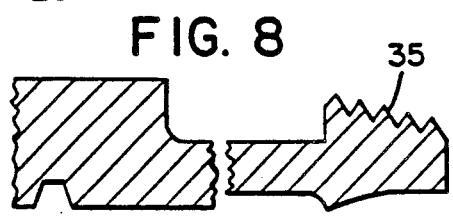
FIG. 8   FIG. 8A
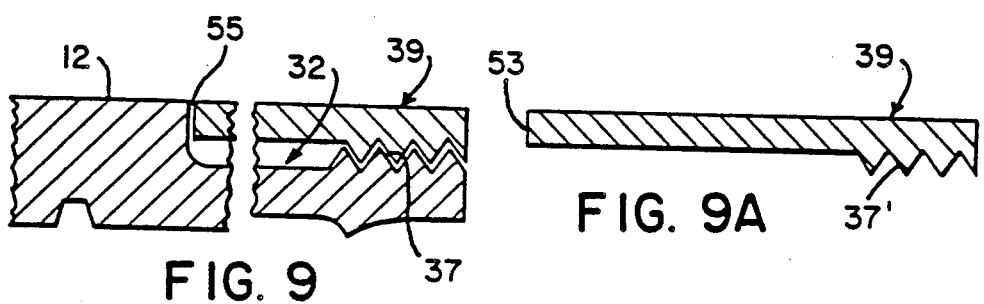
FIG. 9   FIG. 9A
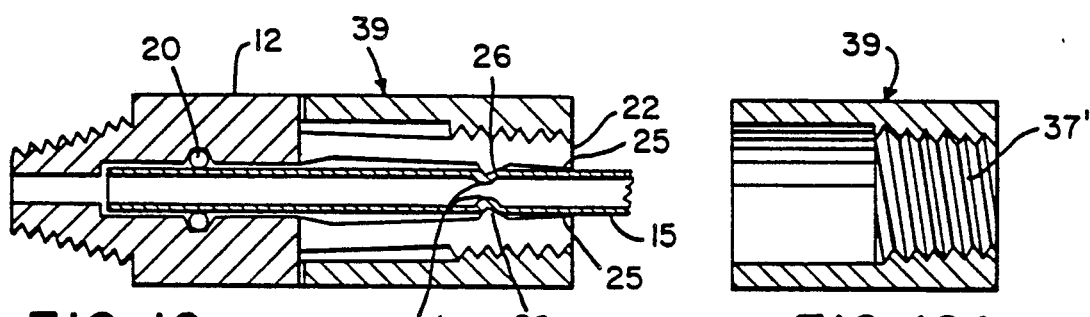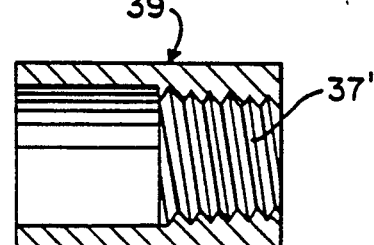
FIG. 10   FIG. 10A
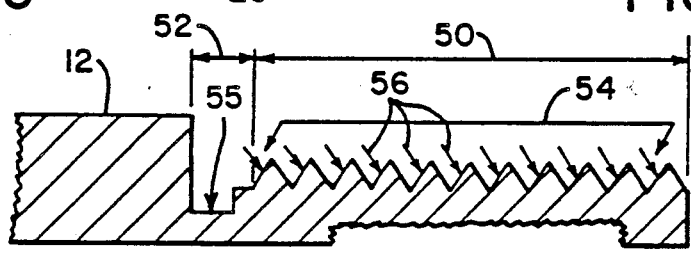
FIG. 11
PRIOR ART
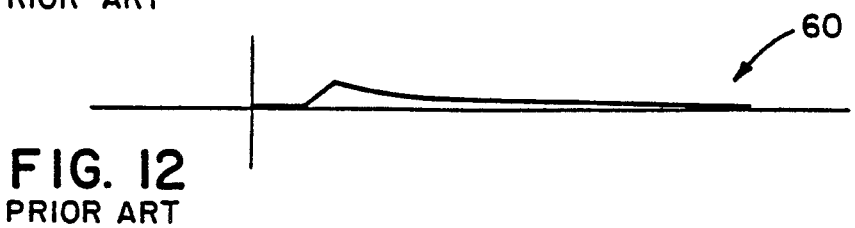
FIG. 12
PRIOR ART

FORCE CONCENTRATING UNITARY FITTING

This application is a continuation, of application Ser. No. 073,637, filed July 15, 1987 now abandoned.

BACKGROUND OF THE INVENTION

1. Field of the Invention

This invention relates to a fitting assembly of the type intended to be used in combination with a conduit through which high pressure fluiid passes and which incorporates a fitting body having a base and a plurality of segments spaced apart from one another and extending outwardly therefrom wherein a force applying means applies an external force to the plurality of segments creating a bending moment about a gripping portion on each of the segments and forcing the gripping segments to engage the outer surface of the conduit at the gripping portion and at a spaced apart free end of each segment from the gripping portion to provide a bending support surface which relieves stress on the conduit during vibration thereof at the point of gripping engagement between the gripping portion and the outer surface of the conduit.

2. Description of the Prior Art

An area of substantial technical and commercial importance has been the use of metal tubes or conduits, of different wall thickness, to contain fluid media such as liquid, gases, etc. for use in areas such as high pressure hydraulics, gas transmission systems, air conditioning systems and the like. Fittings for joining or connecting such tubing exist in a variety of forms but all must perform certain basic functions. These functions include the mechanically holding of the tubes or conduits together or the holding of a single tube in another structure. In addition, the aforementioned functions further include the providing of a leak proof seal for the liquid or gas contained within the conduit. Another important function of the type of fitting referred to is the resisting of bending fatigue which arises from the movement of the tube being held by the subject fitting. Also, a preferred fitting structure should provide or facilitate re-usability so that the fitting can be applied, removed and then reapplied again for additional usage. The subject preferred fitting should also be vibration resistant again, in order to resist the bending fatigue as set forth above.

One category of fittings existing in the prior art and attempting to overcome the aforementioned problems includes the use of a compression ring or ferrule. In this type of fitting, a compression ring or ferrule, which is a piece of hardened metal formed into a ring or cone-like structure, without being split, is forced onto the outer surface of a conduit to hold the conduit and to form a pressure seal. This fitting is not unitary and the basic functions of holding and sealing are performed by the compression ring. In some designs evident in the prior art, two rings are required such as is demonstrated in U.S. Pat. No. 4,304,422.

Another category includes the utilization of a split collet or split cone or ring design. In this prior art category of fittings a spilt collet squeezes upon a tube or the outer portion thereof with the tightening of a nut as demonstrated by certain fittings commercially available and manufactured by the Lenz Corporation.

Split jaws with a taper or with a tapered nut define yet another category of prior art fittings. In such type of fittings an "O" ring seal is used for the pressure seal in conjunction with a metal tube. A mechanical grip is provided by the split jaws either squeezing directly upon the tube or by the jaws squeezing an inserted split ring which is then squeezed upon the tube. This latter method is not unitary. For example, the use of a split ring as an intermediary in holding is disclosed and taught in U.S. Pat. No. 3,843,169 to Wise and also in British Patent No. 345,746 to Turner.

In the case of the split jaws squeezing directly upon the outer surface, the holding or gripping ability of the fitting is derived from the frictional contact of the inner surface of the fitting jaws and the outer surface of the tube. Thus, in the prior art of tapered jaw fittings, attempts were made to maximize the area of surface contact between the inner surface of the jaws and the outer surface of the tube. An example of this category of prior art fittings is disclosed in French Patent No. 2442392 to Forges. A number of devices which are not fittings per se also attempt to hold an object in frictional contact. Many of these devices may be considered clamps for holding drill bits, axial shafts and solid circular rods of various types. Some example of devices of these segmented jaw clamps include British Patent No. 1047869 to Ross and U.S. Pat. Nos. 4,095,914 to Thompson and 923,014 to Garretson.

It is important to recognize that there is a fundamental difference between devices designed to grab and hold solid metal shafts and fittings designed to grab and hold metal tubing. This difference is perhaps not so obvious when comparing split jaw fittings which utilize surface friction and split jaw clamps which also utilize surface friction. However, as will be seen in the present invention to be described in greater detail hereinafter, a new category of fittings of which the present invention is a part does not depend upon surface friction between jaws and the outer surface of the tube or conduit for holding. The difference, as demonstrated by the present invention, is truly dramatic and a fundamental difference from the aforementioned prior art fittings.

Using a tapered nut in combination with externally and internally threaded jaws is demonstrated in U.S. Pat. No. 2,383,692 to Smith. Smith attempts to improve holding power by having the internal threads "bite" into the external surface of the tube. A key point to note in the fitting design of Smith is that the internal thread extends over the entire interior surface area of the jaw right up to the end of the jaw. As will be seen, this renders the Smith design ineffective in reducing or eliminating bending fatigue.

A key point to note in the various segmented end fittings demonstrated in the prior art is that the outer surface of the segments thereof are almost entirely covered with threads. Generally, the outer surfaces of the segments are threaded from the distal end of the segment to a point near where the segment joins the main body or base of the fitting. This is true both in the case of Smith as set forth above and Forges, both previously referenced. The same may be said of the segmented clamping devices which are not fittings per se, such as demonstrated an taught in U.S. Pat. No. 1,659,268 to Hooley; Heyner, Swedish Patent No. 87205 and Habler, German Patent No. 7628297. The prior art has developed to a point where it appears natural to have as much as possible of the external surface of the segment or jaw covered with threads since a large number of force vectors, one at each thread surface, is produced in order to maximize the overall spread of gripping force and thereby increase the bite holding or gripping ability of the fitting. As will be seen hereinafter, this reasoning in the prior art was misdirected and the gripping ability can be vastly improved through the novel force distribution considerations demonstrated in the present invention.

An additional point to note in the Hooley patent as set forth above is that the conduit connector includes small ribs or studs on the internal jaw surface. Such ribs or studs are not suitable for fittings as such projections will interfere with the small clearance required between the O-ring seals and the tube surface for effective design and sealing.

Also present in the prior art is the demonstration of split jaws without tapered jaw or nut and without shaped or inclined jaw ends. Such a fitting design of this type is singularly demonstrated in U.S. Pat. No. 4,544,186 to Proni (inventor herein). The Proni structure is the only fitting design which operates on a purely radial displacement produced by a camming reactive force. In the Proni design force is exerted upon the threads on the outer surface of the jaws, causing the jaws to move radially inward. In one embodiment of the Proni structure the interior surfaces of the jaws possess a tip which is located at the distal end of the jaw segments. This jaw design is ineffective or less than efficient in resisting bending fatigue. The tip located at the end of the jaw is a stress riser, leading to premature failure under bending or vibration of the tube.

Further, in the Proni structure as in the design of other prior art split jaw fittings, no consideration is given to force concentration at specific locations along the segment or jaw external surface. In fact, in the Proni fitting design as in the clamp design of Heyner, previously referenced, the largest force is exerted upon the jaw thread surface closest to the camming action surface or shoulder; the second largest force on the second jaw thread surface, the third largest force on the third threaded surface, and so on. This method, as demonstrated, is less than totally effective in developing a clamping force since the bending moment of the closest thread surface is very small and as the distance of the subsequent thread surfaces from the shoulder or camming surface of the Proni fitting increased the force per thread decreases resulting in ineffective gripping. The only consideration given in the Proni design to a separation of threads from the camming surface is to increase the flexibility or bendability of the jaw segment itself. No consideration is given or implied to spatial force concentration or distribution.

It should be readily apparent, therefore, that in overcoming the problems present in the prior art the specific need is for a split jaw or segmented end fitting which provides excellent bending fatigue resistance while gripping and sealing high pressured fluid carrying conduits or tubes. In particular, a fitting design which can separate the functions of sealing, gripping and fatigue resistance by spatially separating the interior fitting structures performing the above functions is needed. To the knowledge of the inventor herein no such unitary fitting structure exists in the prior art.

To achieve the specific need a second specific need presents itself. This second need is for a spatially structured force upon the external surface of each jaw or segment. The spatial structure of this force must be such that the force is maximized at a specific range interval from the distal or free end of the jaw or segment. With such a spatially structured force appropriate movements and secondary bending moments can be generated. No unitary fittings of which the inventor herein is aware exist in the prior art which provide the spatially concentrated forces upon the outer surfaces of the segment within a selected range of intervals or distances from the free end of the segment.

Such spatial concentration of forces at specified range of distances upon the outer surface of the segments cannot be achieved by mere selection of thread design. Such a concentration is a fundamental insight requiring novel structural features as set forth hereinafter in the present invention.

SUMMARY OF THE INVENTION

The present invention relates to a fitting assembly of the type designed to grip, hold, connect, etc. a hollow conduit itself being specifically designed to allow the passage therethrough of high pressure fluids. Accordingly, the fitting assembly of the present invention comprises a fitting body including a base portion and a segmented portion integrally secured thereto. A passage is disposed in central coaxial relation and extends at least partially through both the base portion and the segmented portion. This passage means is dimensioned to receive the conduit therein and once so positioned, the conduit is secured or "gripped" by the fitting assembly once the fitting assembly or, more specifically, the fitting body is disposed or forced into a gripping position.

The gripping position is defined and accomplished through the application of a force applying means to the fitting body and, more specifically, in surrounding relation to the segmented portion. The force applying means, however, is specifically and cooperatively structured with the segmented portion so as to engage only a first outer surface portion thereof in force transferring relation thereto such that the segmented portion or, more specifically, a gripping means formed thereon is forced into biting and at least partially penetrating relation to the outer surface of the conduit which is now disposed within the passage means.

While specific structural details of the fitting assembly of the present invention, in multiple embodiments thereof, will be described in greater detail hereinafter, it is important to note that the segmented portion comprises a plurality of segments each having an elongated configuration and integrally secured at a proximal end to the base portion of the fitting body. The plurality of segments extend outwardly therefrom into surrounding relation to the central passage means and any conduit formed therein. Each of the segments includes an outer surface extending along the length thereof wherein the outer surface is specifically defined by a first portion extending from a free end along the length thereof towards the base portion but in specifically spaced relation thereto. The configuration of the outer first surface portion is such as to cooperate so as to accomplish a mating engagement with the aforementioned force applying means and through such mating engagement allow force transfer of the force applying means through each of the segments. Each of the segments includes a second outer surface portion extending from the base portion along the length of each of the segments to the first outer surface portion. The second outer portion specifically is configured so as not to be brought into mating engagement with the force applying means to the extent that force is not transferred through the second portion into the segment.

Another important feature of the present invention is the formation of a positioning means in the form of a positioning structure formed on the inner surface of each segment in spaced relation to the free or distal end thereof a distance preferably substantially two-thirds the length of the first outer surface portion but not to exceed the entire length of the first surface portion. Further, each of the segments includes an undercut or recess from which the gripping structure projects outwardly towards the coaxial center of the passage means. Accordingly, application of the force applying means in surrounding and in force transferring engagement to the segmented portion generally and to the first outer surface portion of each segment specifically causes a bending moment to be formed substantially about the gripping structure of each segment due to the external force exerted on each segment through the aforementioned force transferring engagement between the first outer surface portion and the force applying means. The bending moment created thereby causes a bending support surface formed substantially adjacent or contiguous the free distal end of each segment to be brought into supporting relation to the outer surface of the conduit and in spaced relation to the location of gripping contact between the gripping structure and the outer surface of the conduit such that bending fatigue in the conduit itself is diminished by virtue of the bending support surface being brought into supporting engagement with the outer surface of the conduit substantially at the distal end of each segment, as set forth above. In order to accomplish the proper location of the bending moment substantially about the gripping structure of each segment, it is important to note that in a preferred embodiment to accomplish maximum gripping efficiency, the length of the first outer surface portion is substantially equal to or less than 50% of the total length of each segment. However, depending upon the intended pressure, or other design parameters, of the fluid to be transferred through the conduit disposed in the central passage means, the subject fitting assembly is operable with sufficient efficiency such that the length of the first portion may be as much as two-thirds the length of the entire segment extending, as set forth above, from the free end thereof towards but in specifically spaced relation to the base portion.

As will be emphasized in greater detail, the configuration of the first outer surface portion may, in a preferred embodiment, be in the form of external threads. Similarly, a mating internal portion of the force applying means may also be internally threaded so as to form a threaded engagement between the inner surface of the force applying means and the segmented portion along the length only of the first outer surface portion of each segment. However, it should be emphasized that a threaded configuration per se is not a necessity in order to accomplish proper externally applied force to each of the segments at the proper locale in spaced relation to the free end thereof so as to create the aforementioned bending moment of each segment substantially about the gripping structure thereof in order that the aforementioned bending support surface will be brought into supporting engagement with the external surface of the conduit at a spaced distance outwardly from the point of penetration of the gripping structure of each segment. It is also important to note that the specific type or configuration of the threads is not decisive of the force being applied or the concentration of force applied to the segment such that the bending moment is created substantially about the gripping structure in order to position the bending support surface into supporting engagement with the outer surface of the conduit. A gripping position is thereby defined by the gripping structure brought into penetrating engagement with the outer surface of the conduit and the bending support surface being brought into supporting engagement with the outer surface of the conduit in spaced relation to the gripping structure substantially contiguous with the free end of the segment.

BRIEF DESCRIPTION OF THE DRAWINGS

FIGS. 7 and 7A, respective, are sectional representations, in partial schematic form, of a segment and a cooperative force applying means to be applied thereto.

FIGS. 8 and 8A are, respectively, another embodiment of a segment and force applying means being applied thereto.

FIG. 9 is a sectional view, in partial cutaway and schematic form, of a force applying means disposed in force transferring engagement to a segment of the fitting body of the present invention.

FIG. 9A is a sectional representation, in partial schematic form, of a portion of a force applying means specifically structured to engage a segment as shown in the embodiment of FIG. 9.

FIG. 10 is a fitting assembly of the present invention including the force applying means wherein the fitting assembly is shown in a gripping position.

FIG. 10A is a section view showing interior structural details of one embodiment of a force applying means.

FIG. 11 is a representation, in section and partial schematic, of a prior art structure.

FIG. 12 is a force diagram of the structure of FIG. 11.

DETAILED DESCRIPTION OF THE PREFERRED EMBODIMENT

Figure 1:
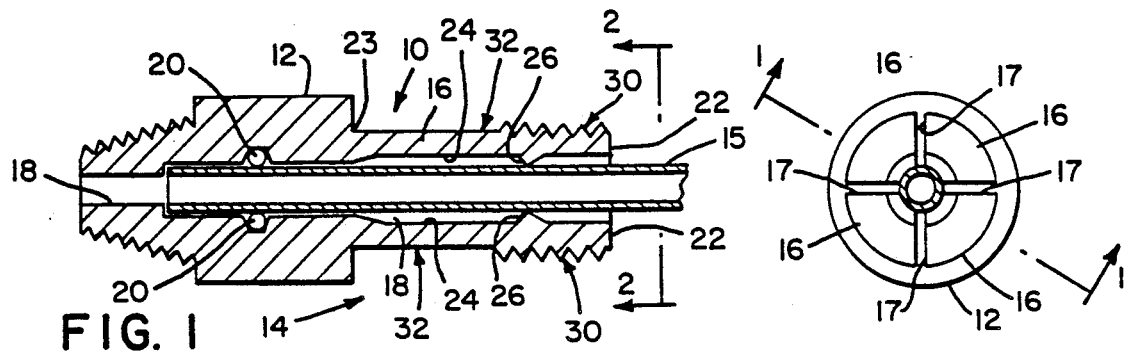
FIG. 1 is a longitudinal sectional view in partial schematic representation along line 1—1 of FIG. 2.
Figure 2:
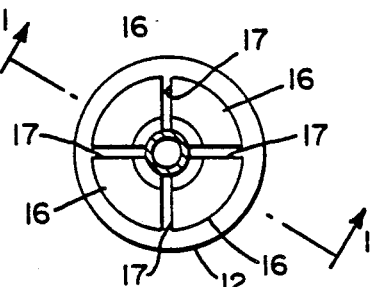
FIG. 2 is an end view along line 2—2 of FIG. 1.

As shown in FIGS. 1 and 2 the important structural features of the invention include the fitting assembly comprising a fitting body generally indicated as 10 and including a base portion 12 and a segmented portion generally indicated as 14. The segmented portion 14 comprises a plurality of segments 16 disposed in spaced apart relation to one another by elongated slots extending from a free or distal end 22 of each segment inwardly to the base as at 23 or a proximal end of each segment. The elongated slots allow radial movement of the segments relative to the base. A passage means 18 is centrally disposed and coaxial relation to both the base and the segmented portion such that each of the plurality of segments 16 are disposed in surrounding relation to the passage 18 and further to a conduit 15 disposable within the passage and, accordingly, within the interior of the fitting body 10. In the embodiment of FIG. 1 the fitting body 10 further comprises a seal means formed on the interior of the base portion 12 and shown in the form of a circular seal or O-ring structure 20 surrounding the conduit 15 which is disposed within the passage 18 so as to establish a fluid tight seal therebetween.

Other structural features include each segment including an undercut portion 24 extending along a majority of the interior surface thereof substantially from a point adjacent the base 12 to the free or distal end 22 of each of the segments 16.

A gripping means in the form of a gripping tip or structure 26 protrudes outwardly from the undercut or recess portion 24 towards the central longitudinal axis of the passage means and, as to be explained in greater detail hereinafter, into a gripping and at least partially penetrating relation to the exterior surface of the conduit 15.

Another important feature of the present invention is the inclusion of each of the segments 16 having a first external surface portion generally indicated as 30 extending from the respective free ends 22 thereof inwardly but in specifically spaced relation to the base 12. Similarly, each segment has a second outer surface portion generally indicated as 32 wherein the second surface portion extends from the base portion 12 outwardly to the first surface portion 30. As clearly shown in FIGS. 1 and 3, the external configuration of the first surface portion 30 includes a threaded configuration (or other specific surface configuration) designed to engage and effectively mate with a force applying means (see FIGS. 2 through 10A) to be described in greater detail hereinafter.

Important structural features of the present invention include the first surface portion 30 extending from the free end of each segment 22 inwardly towards the base a distance preferably at least 50% or less but, as to be explained in greater detail hereinafter, possibly as much as two-thirds the entire length of the segment. In each case, however, each segment has the outer surface portion 30 spaced a significant distance from the base 12 wherein such significant spatial relationship is defined by the existence or length of the second surface portion 32.

Figure 4:
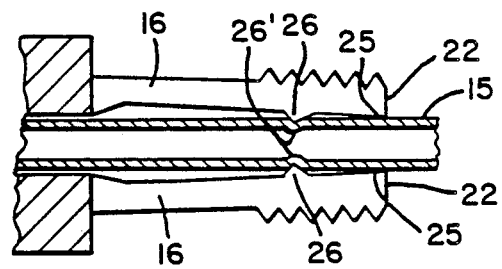
FIG. 4 is a schematic representation of the embodiment of FIG. 1 brought into the aforementioned gripping position while a force applying means is not specifically shown for purposes of clarity.

As shown in FIG. 4, the fitting body 10 is shown in what may be defined as a gripping position which itself is defined by each of the segments 16 disposed into gripping engagement with the external surface of the conduit 15 by means of the gripping structure 26 of each segment engaging and in fact at least partially penetrating the outer surface of the conduit 15. In addition, a bending support surface 25 is defined adjacent or contiguous to the free or distal end of each segment 16 wherein such bending surface portion 25 is brought into supporting engagement with the outer surface in spaced relation from the gripping portion 26 of each segment 16. By virtue of the provision of the bending support surface 25 actually engaging and in effect supporting the outer surface of the conduit in spaced relation from the point of gripping engagement between the structure 26 and the outer surface of conduit 15 bending fatigue at the point of engagement 26' is in fact reduced or significantly diminished to allow for or accommodate vibration of the conduit or repeated reusage thereof, as will be explained in greater detail hereinafter. It should be noted that the outer surface configuration of the gripping structure 26 is such as to actually cause a penetrating or biting action with the outer surface of the conduit as clearly pictured in FIGS. 4 and 5. Such gripping position is accomplished through the application of external force to each of the segments concurrently through the attachment of a force applying means to be described in greater hereinafter. In order to accomplish the most efficient gripping action of the fitting body 10 on the conduit 15, a preferred embodiment positions the gripping structure 26 approximately two-thirds the length or distance from the free end 22 of each segment as the entire length of the first portion 30. It should be noted, however, that, in effect, the gripping structure 26 can in fact be substantially equal to or at least somewhat less than the length of the first portion 30 extending from the free end 22 of each segment.

Figure 3:
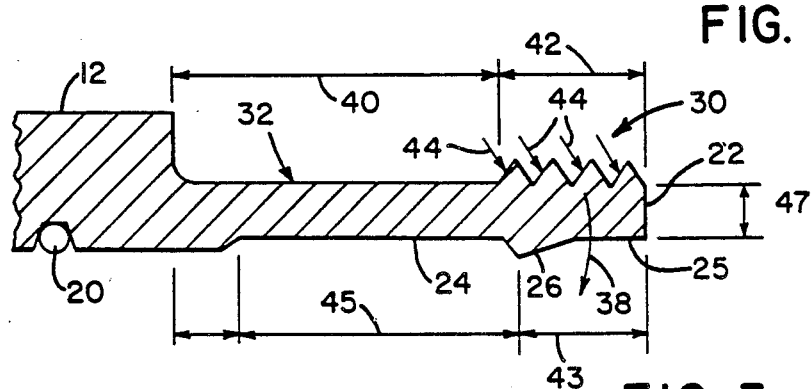
FIG. 3 is a schematic representation in section of one of a plurality of segments and its interconnection to the base portion of the fitting body, and more specifically, the relative configuration dimensions and positions of the outer surface portions of each segment and the concentration of force thereon when a force applying means is applied thereto.
Figure 5:
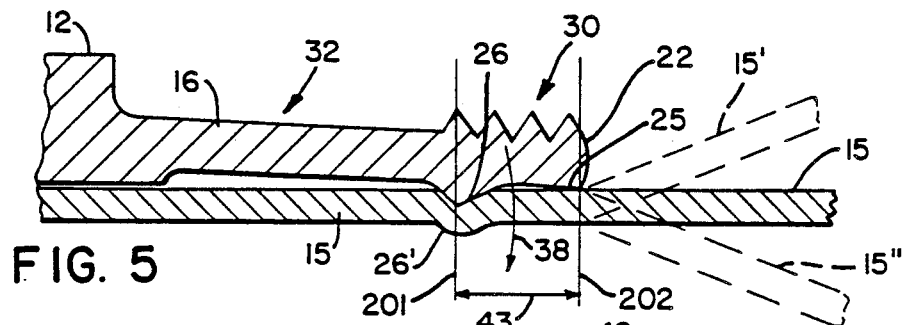
FIG. 5 is a schematic representation in section of a segment in gripping position and a tube or conduit in three conditions of deflection.
Figure 6:
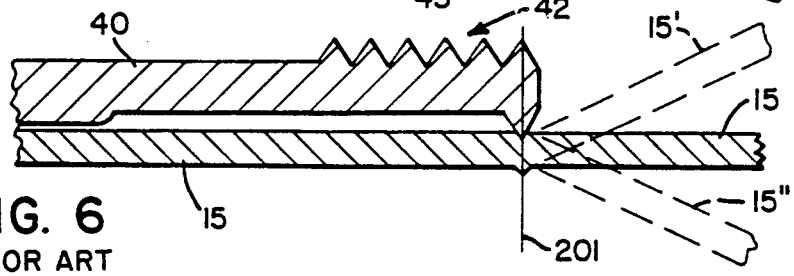
FIG. 6 is schematic representation in section, being generally representative of a prior art structure, of segment in gripping position and a tube or conduit in three conditions of deflection.

With reference to FIGS. 4, 5 and 6, a key factor in establishing a bending moment 38 with respect to the gripping structure 26 is the relationships of the lengths 40, 42, 43 and 45 shown in FIG. 3. Length 43 is the distance between the gripping structure 26 of each segment and the distal end 22 of that segment 16. In order to form the bending moment 38 substantially about the gripping structure 26 which is of the appropriate magnitude and in the direction towards the conduit 15 or central passage in which the conduit is positioned, there must be forces 44 exerted only upon the outer surface of the first outer surface portion 30 or, more specifically, upon the threaded surface extending along the length of the first outer surface portion 30. The length 42 of the first outer surface portion 30 runs, as shown, from the distal end 22 to the beginning of the second surface portion 32 and specifically a spaced distance from the base 12. The length 43 is preferably two-thirds of the length 42 wherein both lengths are measured from the distal end 22 of the respective segments 32. The second surface portion 16 must be unthreaded or specifically configured not to engage the force applying means along its entire length as at 32. If it was threaded or brought into engagement with the force applying means along the length of the second surface portion 32 an opposing bending moment (see FIGS. 17 and 17A) about the gripping structure 26 would be created thereby reducing the effectiveness of the desired bending moment 38. Since the gripping structure 26 must be located nearer the free or distal end 22 of the respective segments 16 that it is to the base 12, the length 42 is preferably a maximum of two-thirds the entire length of the segment or, in a preferred embodiment, 50% of the length of the segment or less. Length 45 provides a portion of the basic undercut required to allow penetration of the gripping structure 26. An undercut is made in order to allow the gripping structure 26 to engage the outer surface of the conduit 15 while not interfering with sealing engagement of the sealing structure 20 with the outer surface of the conduit 15 as pictured in FIG. 1 so as to establish a fluid tight seal therebetween at that point. In FIG. 5 a sectional view of a single segment 16 in an engaged position is shown. This engaged position represents the gripping position wherein only, for purposes of explanation and clarity, a single segment is shown. The gripping position is defined also by the bending support surface 25 engaging the outer surface of the conduit 15 as also shown. Also shown in FIG. 5 are three positions 15, 15' and 15'' of the conduit. In position 15 the conduit is not being deflected. In position 15' the conduit is deflected in one direction and in position 15'' the conduit is deflected in the opposite direction. A substantially stress is created at the point of contact between the outer surface of the conduit 15 and the bending support surface 25 as the conduit 15 undergoes bending. The maximum bending moment of the conduit occurs at section 202 in FIG. 5. At section 202 the outer surface of the conduit is integral and is not penetrated or cut by the bending support surface 25 thereby enabling the conduit to resist fatigue stresses for a great number of cycles, such as in vibration or cyclic loading (repeated usage). In contrast, in FIG. 6 a fitting is shown in which distance 43 is greatly reduced to near zero. As in FIG. 5 three conduit positions 15, 15' and 15'' are shown. When the conduit 15 is subject to bending and to vibration the maximum bending moment of the conduit occurs at section 201 in FIG. 6. However, this section is relatively weak because the diameter is diminished due to the penetration of the gripping structure 26 and consequently the moment of inertia is smaller. Additionally, if the gripping structure 26 shown in FIG. 6 is sharp, the penetration groove 26' in the wall of the conduit is a stress riser. The result is that the tube fails at section 201 (FIG. 6) due to fatigue in a relatively low number of bending or vibratory cycles. By contrast, in FIG. 5 the structure 26 is spaced inwardly from the distal end 22 of the segment 16 by the distance 43. Thus, in FIG. 5 the section 201 containing the gripping structure 26 penetrates into the outer surface of the conduit 15 and is spaced from the section 202 at which the bending support surface 25 engages the outer surface of the conduit 15 which is subject to maximum bending moment as set forth above.

With regards to FIGS. 7 through 9A, the forces 44 as best shown in FIG. 3, may be generated by any one of a variety of designs of a force applying means generally indicated as 39 and represented in the form of nut 39, 39' and 39'' in the aforementioned figures. The specific thread chosen for force transferring interconnection between the nut and the first portion 30 of each of the segments is a matter of choice and is per se not fundamental to the operative features of the present invention and the creation of the proper bending moment or concentrated force 38 (see FIG. 5). In FIGS. 7 and 7A, nut 39' contains standard threads 33' together with a wedging/camming surface 33''. Camming surface 33'' rubs against segment surface 33''' thereby producing forces 44 (see FIG. 3). In FIGS. 8 and 8A, tapered thread 35 and 35' is placed both on the first portion 30 of fitting segment 16 and nut 39'', respectively. As nut 39'' is tightened on the segment 16, forces 44 (see FIG. 3) will be produced. FIGS. 9, 9A shows a partially threaded nut 39 having a standard thread 37' and the first portion 30 of each of the segments having a standard thread 37. As shown in FIG. 9, the proximal end 53 of nut 39 contacts transverse surface 55 creating a reactive force and producing the forces 44 (see FIG. 3).

As shown in FIGS. 10 and 10A, a full representation of both the fitting body with the force applying means 39 applied thereto is shown such that the various segments are brought into gripping engagement with the conduit 15 in a manner which allows penetration of the gripping structure 26 into the outer surface of the conduit 15 while at the same time forcing, through the creation of the proper bending moment (see 38 in FIG. 3), supporting engagement of the bending support surface 25 with the outer surface of the conduit at a spaced distance from the gripping penetration of the gripping structure 26 into the conduit 15 and substantially contiguous or adjacent to the distal ends of the respective segments. Further, the gripping position as shown in FIG. 10 is further defined by an additional point of contact with the seal structure 20 engaging the outer surface of the conduit 15 which is within the central passage such that substantially three points of engagement occur. Such three points of engagement, as set forth above, are defined by the point of engagement of the seal structure 20 with the outer surface of the conduit as well as the penetrating gripping engagement of the structure 26 with the outer surface of the conduit and finally the supporting engagement of the bending support surface 25 with the outer surface of the conduit 15.

Figure 13:
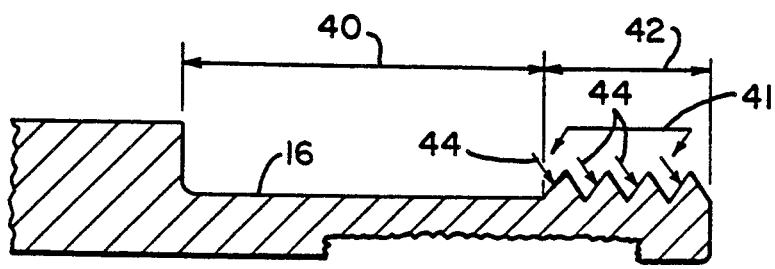
FIG. 13 is a sectional view, in partial schematic, of one of a plurality of segments on the fitting body of the present invention wherein forces are represented as being applied thereto.
Figure 14:
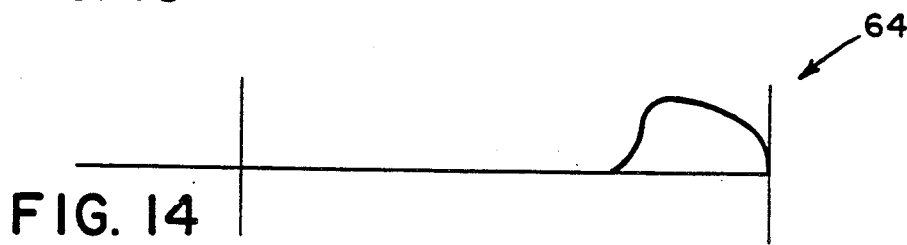
FIG. 14 is a force diagram of the embodiment of FIG. 13.

FIG. 11 represents embodiments of the prior art in which the unthreaded distance 52 is much less than than the first threaded portion 54 or distance 50. The purpose of the short, unthreaded distance 52 is to increase the bendability or flexibility of the segment relative to the base 12. To further enhance the flexibility of the segment relative to the base 12 an indentation 55 is placed into the segment adjacent the proximal end of the segment. In FIG. 12 the distribution of the magnitude of the forces 56 upon the threads of the segment of FIG. 11 is clearly shown and is generally represented as 60. As may be seen from FIG. 12, the greatest force is upon the threaded surface nearest base 12 and the force upon each subsequent thread diminishes thereafter. This results in an inefficient bending of the segment of FIG. 11 and weak gripping of an inserted tube or conduit, such as 15. FIG. 13 shows the embodiment wherein the threaded external segment surface 42 is less than the unthreaded external segment surface 40. FIG. 14 shows the distribution of the magnitude of the forces 44 upon the threaded surface of the first outer portion 42 and upon the second outer surface (unthreaded) 40.

A relatively ineffective force distribution and subsequent holding power is evident in the segment surface of the embodiment of FIG. 11 as when the length 50 exceeds the length 52 through a significant portion or when the length 50 exceeds more than substantially two-thirds the entire length of the segment. Furthermore, elasticity of the segment which is a key factor in fitting re-usability is not enhanced by the presence of the indentation 53 or the general reduction of material over the length 52.

Figure 15:
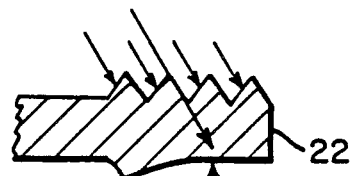
FIGS. 15 and 15A show embodiments incorporating different thread structures along a first outer surface portion thereof.
Figure 15A:
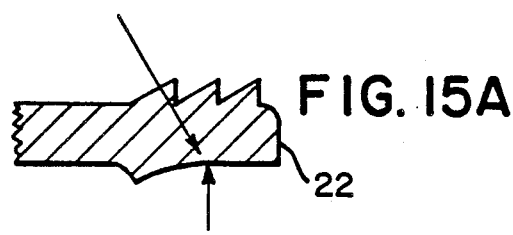

FIGS. 15 and 15A represent the proper creation of force concentration regardless of the thread design wherein the first portion extends from the distal end 22 along the length thereof but less than two-thirds of the distance of the entire length.

Figure 16:
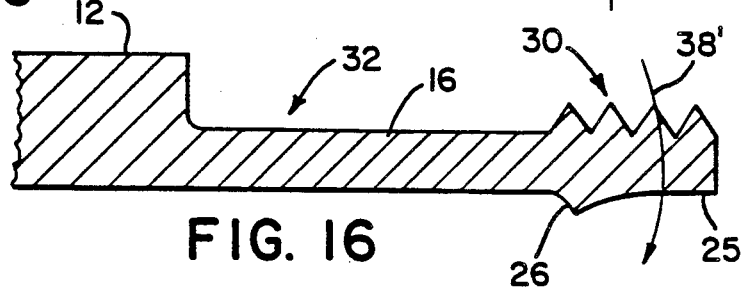
FIG. 16 is a schematic representation in section of one segment and the bending moment being applied thereto.
Figure 17:
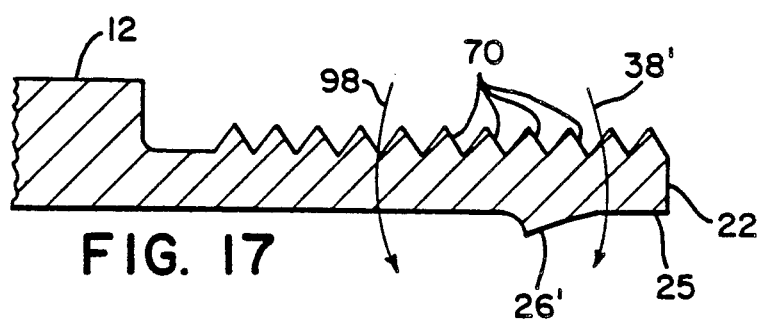
FIGS. 17 and 17A are sectional views, in schematic form, of ineffectively dimensions segments as indicated.
Figure 17A:
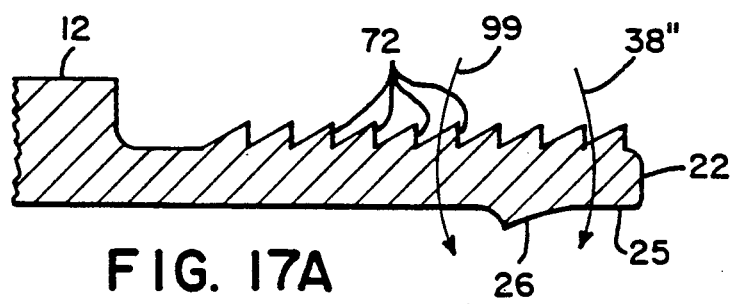
Figure 18:
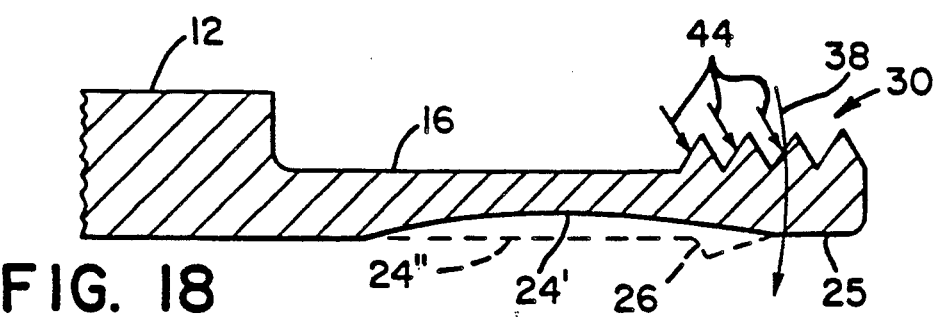
FIG. 18 is yet another embodiment of the present invention with a different undercut configuration on the inner surface of each segment.

FIGS. 16, 17 and 17A are demonstrated to show that the preferred embodiment of the present invention is represented in FIG. 18 resulting in the proper creation of concentration of force or bending moment 38' substantially along or about the gripping structure 26 as the force applying means (not shown) is properly applied.

However, FIGS. 17 and 17A show relatively ineffective structures such that one cannot achieve the proper bending moment or concentration of force no matter how the thread design is varied when in fact the thread design extends along almost the entire length of the outer surface of the thread from the distal end 22. Clearly, as the thread length 70, 72 in FIGS. 17 and 17A increases to extend almost along the entire outer surface of the various segments, negative or opposite bending moments 98 in FIG. 17 and 99 in FIG. 17A are created. Bending moments 98 and 99 which are negative counter-clockwise bending moments about point 26', oppose the desired positive or clockwise bending moment 38'. Therefore, bending support surface is not effectively positioned into engagement with the outer surface of the conduit 15 as shown by the proper gripping position demonstrated in FIGS. 4 and 5.

Figure 19:
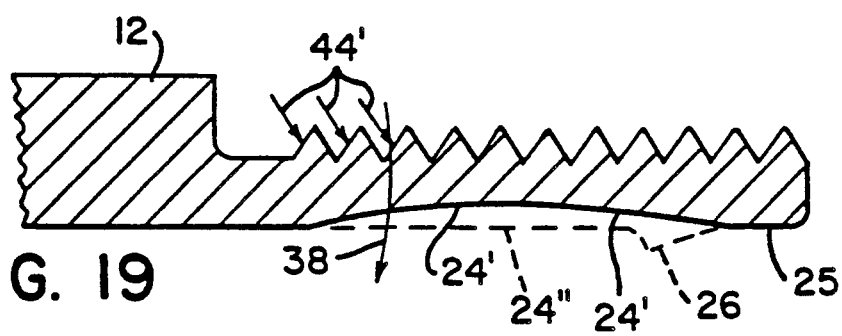
FIGS. 19 and 19A represent prior art segments with arbitrary undercuts in section and partial schematic with transverse force being applied thereto and with different external threaded configurations.
Figure 19A:
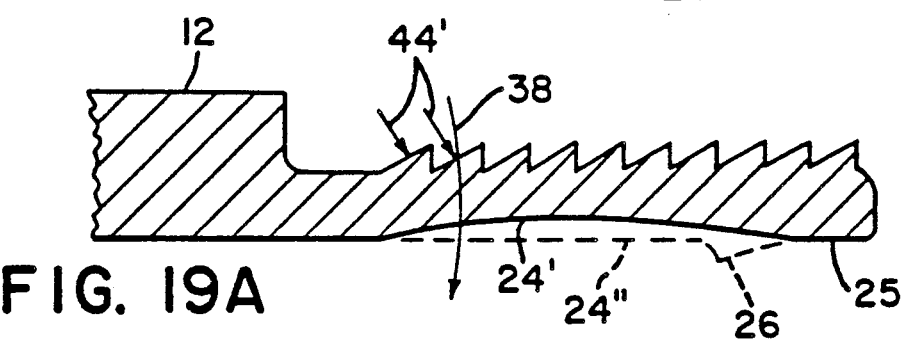

This is further demonstrated in FIGS. 18, 19 and 19A wherein regardless of the configuration of the surface 24' as represented in solid lines in FIGS. 18 through 19A the creation of proper bending moment 38 substantially about the gripping structure 26 occurs when the threaded first portion generally indicated as 30 is less than 50% of the entire length of the segment and preferably no greater than two-thirds the length of the segment. As set forth above, the longer the length of the threads, as shown in FIGS. 19 and 19A, and regardless of the thread design, the concentration of force or bending moment 38 is displaced closer to the base 12 which is ineffective in accurately positioning the bending support surface 25 relative to the outer surface of the conduit, as best shown in FIG. 10.

What is claimed is:

1. A fitting assembly for attachment to a conduit designed for the flow of fluids under pressure therein, said assembly comprising:
    a. a fitting body including a base and a segmented portion secured to said base and extending outwardly therefrom to a distal end of said body,
    b. a passage means for receiving the conduit formed within said fitting body and extending from said base and said segmented portion and exiting substantially at said distal end,
    c. said segmented portion comprising a plurality of spaced spaced apart elongated segments each secured to said base and extending outwardly therefrom and terminating at free ends common to said distal end and collectively disposed in surrounding relation to said passage,
    d. each of said segments comprising an outer surface extending along its length and including a first portion and a second portion, said first portion extending no greater than substantially two-thirds the length of each segment from said free end thereof toward said base and spaced from said base,
    e. said second portion of each segment extending from said base along the length of each segment to said first portion,
    f. a gripping means formed on an inner surface of each segment a spaced distance from said free end thereof and structured and disposed for gripping engagement with an outer surface of a conduit within said passage means,
    g. a support means formed on the inner surface of each segment at said free ends,
    h. force applying means securable to said segmented portion in force transferring engagement with said first portion of each segment for concurrent application of an external force to said plurality of segments causing said gripping means to penetrate said conduit in a gripping arrangement and said support in supporting relationship, said first portion of each segment having a threaded configuration along its length, said force applying means comprising an internally threaded structure dimensioned to concurrently engage said threaded configuration of said first portions of said plurality of segments in force transferring relation thereto and said force applying means further comprising a proximal end disposed in abutting engagement with said base when said gripping means is in said gripping arrangement.

2. An assembly as in claim 1 wherein said gripping means of each segment is spaced a distance from said free end thereof substantially equal to or less than the length of said first portion.

3. An assembly as in claim 2 wherein said gripping means of each segment is spaced a distance from said free end thereof equal to substantially two-thirds the length of said first portion.

4. An assembly as in claim 3 wherein said gripping means comprises a protrusion formed on said inner surface of each segment and extending outwardly therefrom into engageable relation with the outer surface of the conduit.

5. An assembly as in claim 4 wherein said protrusions on each of said segments are disposed collectively in substantially coplanar relation to one another.

6. An assembly as in claim 4 wherein said protrusion of each segment comprises an extremity configured to penetrate the outer surface of the conduit at a point of engagement therewith upon external force being applied to said first portion thereof.

7. An assembly as in claim 6 wherein said free end of each segment is configured to engage the outer surface of the conduit in non-penetrating relation thereto.

8. An assembly as in claim 1 further comprising a seal means mounted on said fitting body within said passage in engageable relation with the outer surface of the conduit for establishing a fluid tight seal therebetween.

9. An assembly as in claim 8 wherein said fluid tight seal is disposed in spaced relation to both said gripping means and said free ends of said plurality of segments, the outer surface of the conduit being engaged in at least three spaced apart locations by said seal means, said gripping means and said free ends of each segment, respectively.

10. An assembly as in claim 9 wherein said seal means comprises an O-ring mounted on said based within said passage and disposable in continuous surrounding sealing engagement with the outer surface of said conduit.

11. An assembly as in claim 10 wherein said O-ring is formed of a flexible material and disposed within an annular channel integrally formed in recessed relation to an inner surface of said base, said O-ring dimensioned to protrude outwardly from said channel and said inner surface of said base into sealing engagement with the outer surface of the conduit.

12. An assembly as in claim 1 wherein said force applying means is disposed in non-transferring relation to said second portion when said fitting body is in said gripping position.

13. An assembly as in claim 1 wherein each of said plurality of segments comprises an undercut formed along said inner surface thereof and extending substantially along a major portion of its length, each of said plurality of segments comprising a lesser thickness than a corresponding wall portion of said base, whereby bending of each segment substantially about said gripping portion is facilitated upon an application of external force to each segment by said force applying means.

14. An assembly as in claim 13 wherein said gripping means comprises a protrusion formed on said inner surface of each segment and extending outwardly from said undercut formed along the length of said respective inner surface thereof, said protrusion extending towards a central longitudinal axis of said passage and into engageable, penetrating relation with the outer surface of the conduit within said passage upon the assumption of said fitting body into said gripping position.

15. An assembly as in claim 14 wherein said protrusion of each segment is spaced a distance from the respective free end thereof substantially less than the length of the respective first portion.

16. An assembly as in claim 15 wherein said gripping position is further defined by said protrusion and said free end of each segment engaging the outer surface of the conduit at spaced locations from one another.

17. An assembly as in claim 15 further comprising a seal means mounted on said fitting body within said passage in engageable relation with the outer surface of the conduit for establishing a fluid tight seal therebetween, said gripping position further defined by said protrusion, said free end of each segment and said seal means each engaging the outer surface of the conduit at spaced locations from one another.

18. An assembly as in claim 1 wherein said first portion of each segment extends no greater than substantially one-third the length of each segment from said free end thereof towards said base and spaced therefrom.

19. An assembly as in claim 18 wherein said gripping means of each segment is spaced a distance from said free end thereof substantially equal to or less than the length of said first portion.

20. An assembly as in claim 19 wherein said gripping means of each segment is spaced a distance from said free end thereof equal to substantially two-thirds the length of said first portion.

* * * * *